(12) United States Patent
Ekladyous et al.

(10) Patent No.: US 10,935,203 B2
(45) Date of Patent: Mar. 2, 2021

(54) MICRO FRONT LIGHTING SYSTEM FOR VEHICLE

(71) Applicant: Ford Global Technologies, LLC, Dearborn, MI (US)

(72) Inventors: Albert Ekladyous, Shelby Township, MI (US); Udayakumar Ramasami, Novi, MI (US); Lisa Hohmann, Clinton Township, MI (US); Alex Jacobson, Dearborn, MI (US); Arun Kumar, Farmington Hills, MI (US); Kelley Adams-Campos, Ferndale, MI (US); Sarbjit Singh, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/115,716

(22) Filed: Aug. 29, 2018

(65) Prior Publication Data
US 2020/0072430 A1    Mar. 5, 2020

(51) Int. Cl.
| *F21S 41/25* | (2018.01) |
| *B60Q 1/06* | (2006.01) |
| *B60Q 1/18* | (2006.01) |
| *F21W 102/10* | (2018.01) |
| *F21W 107/10* | (2018.01) |

(52) U.S. Cl.
CPC ............. *F21S 41/25* (2018.01); *B60Q 1/06* (2013.01); *B60Q 1/18* (2013.01); *B60Q 2300/05* (2013.01); *F21W 2102/10* (2018.01); *F21W 2107/10* (2018.01)

(58) Field of Classification Search
CPC . B60Q 1/121; B60Q 1/16; B60Q 1/18; B60Q 1/24; B60Q 1/53; B60Q 1/60; B60Q 1/70; B60Q 1/06; B06Q 2200/00; F21V 21/30
See application file for complete search history.

(56) References Cited

U.S. PATENT DOCUMENTS

| 6,497,503 B1 * | 12/2002 | Dassanayake ........ F21S 41/675 362/465 |
| 9,074,745 B2 * | 7/2015 | Lee ...................... B60Q 1/0041 |
| 2005/0201090 A1 * | 9/2005 | Knight .................... F21V 14/02 362/230 |
| 2011/0121733 A1 * | 5/2011 | Choi ...................... B60Q 1/122 315/82 |

(Continued)

FOREIGN PATENT DOCUMENTS

| CN | 106218533 A | 12/2016 |
| CN | 104986096 B | 11/2017 |
| DE | 19632252 B4 | 3/2006 |

OTHER PUBLICATIONS

Hella, Headlamps: Let There Be Light, Retrieved on Jun. 29, 2018m from https://www.hella.com/hella-in/Headlamps-225.html.

(Continued)

*Primary Examiner* — Anabel Ton
(74) *Attorney, Agent, or Firm* — David Coppiellie; Carlson, Gaskey & Olds, P.C.

(57) ABSTRACT

A method and apparatus provide a light module that includes a plurality of optical functions supported by a single housing. The method and apparatus further adjusts aiming of all optical functions of the light module in multiple directions when needed.

18 Claims, 12 Drawing Sheets

(56) References Cited

U.S. PATENT DOCUMENTS

| | | | |
|---|---|---|---|
| 2012/0155088 A1* | 6/2012 | Spaccasassi | F21V 19/02 |
| | | | 362/249.04 |
| 2017/0097132 A1* | 4/2017 | Hager | F21S 41/635 |
| 2017/0253170 A1* | 9/2017 | Neal | B60Q 1/0023 |
| 2018/0027634 A1* | 1/2018 | Dalavayi | H05B 37/0272 |
| | | | 315/77 |
| 2018/0099606 A1 | 4/2018 | Dudar | |
| 2018/0112858 A1* | 4/2018 | Bowden | F21V 21/30 |
| 2019/0128497 A1* | 5/2019 | Tessnow | G01M 11/068 |

OTHER PUBLICATIONS

Hella KGaA, Technical Information, Light-Headlamps, Retrieved from home.zcu.cz/~formanek/VYUKA/Data/TIScheinwerfe_GB_TT_18.pdf.

\* cited by examiner

MICRO FRONT LIGHTING SYSTEM FOR VEHICLE

TECHNICAL FIELD

This disclosure relates to a lighting system for a vehicle and methods for adjusting aiming of all optical functions of a light module in multiple directions.

BACKGROUND

For vehicle front lighting, there is a need to make a light system or light module that is as small as possible to reduce weight, save cost, and free up packaging space for other vehicle components. Current light systems can include multiple different optical functions that have lights located at many different areas on a front of a vehicle. In one known example configuration, a fog lamp is located at a lower edge of a front bumper area, a headlamp is located above the front bumper near a grill area, and turn signal, park, and/or cornering lamps are located at outer front or side edges of the front of the vehicle. Having individual lamp modules at each of these locations takes up a significant amount of packaging space and makes it difficult to provide other vehicle features, including advanced light functions such as bend lighting.

SUMMARY

An apparatus according to an exemplary aspect of the present disclosure includes, among other things, a housing, a plurality of lights to perform a plurality of optical functions, each light supported by the housing to provide a single light module, and a control to adjust aiming of all optical functions of the single light module when needed, wherein the control is capable of adjusting aim in multiple directions.

In a further non-limiting embodiment of the foregoing apparatus, the multiple directions include at least horizontal and vertical directions.

In a further non-limiting embodiment of any of the foregoing apparatus, the plurality of optical functions includes at least eight different optical functions.

In a further non-limiting embodiment of any of the foregoing apparatus, the plurality of optical functions further include at least two additional different optical functions.

In a further non-limiting embodiment of any of the foregoing apparatus, the plurality of optical functions include lower beam, upper beam, park, turn, daytime running, cornering, front side marker, front side reflector, fog, and signature light functions.

In a further non-limiting embodiment of any of the foregoing apparatus, the control includes an electronic control unit that generates control signals that are communicated to at least one motor coupled to the housing.

In a further non-limiting embodiment of any of the foregoing apparatus, the light module includes a circuit board carrier fixed within the housing, an optics support supported by the housing, at least one printed circuit board coupled to the circuit board carrier and in communication with the electronic control unit, and wherein the plurality of lights is mounted to the optics support.

In a further non-limiting embodiment of any of the foregoing apparatus, the housing defines a center axis, and wherein the plurality of lights include a first set of lights circumferentially spaced about the center axis, a second set of lights circumferentially spaced about the center axis, and a third set of lights circumferentially spaced about the center axis radially outward of the first and second sets of lights.

In a further non-limiting embodiment of any of the foregoing apparatus, the plurality of lights further includes at least one first light concentric with the center axis and radially inward of the first and second sets of lights, and at least one second light positioned between two adjacent lights of the third set of lights.

In a further non-limiting embodiment of any of the foregoing apparatus, a device is mounted to an outer peripheral surface of the housing, wherein the device assists in providing front side marker and front side reflex optical functions.

A method according to another exemplary aspect of the present disclosure includes, among other things, providing a light module that includes a plurality of optical functions supported by a single housing and adjusting aiming of all optical functions of the light module in multiple directions.

In a further non-limiting embodiment of the foregoing method, the multiple directions include at least horizontal and vertical directions.

In a further non-limiting embodiment of any of the foregoing methods, the plurality of optical functions include at least lower beam, upper beam, park, turn, daytime running, and cornering functions.

In a further non-limiting embodiment of any of the foregoing methods, the plurality of optical functions further include one or more of front side marker, front side reflector, fog, and signature light functions.

In a further non-limiting embodiment of any of the foregoing methods, the multiple directions include at least horizontal and vertical directions.

In a further non-limiting embodiment of any of the foregoing methods, the method includes adjusting aiming of all optical functions simultaneously as one unit.

In a further non-limiting embodiment of any of the foregoing methods, the method includes adjusting aiming in response to at least one data input that includes one or more of vehicle speed, steering wheel angle, wheelbase, steering box ratio, and vehicle pitch.

In a further non-limiting embodiment of any of the foregoing methods, the method includes installing the light module at a headlamp location on a front end of an autonomous vehicle, and installing at least one camera immediately adjacent to the light module on the front end of the autonomous vehicle.

In a further non-limiting embodiment of any of the foregoing methods, the method includes installing a plurality of cameras on the front end and installing at least one of a LIDAR or RADAR sensing system on the front end.

In a further non-limiting embodiment of any of the foregoing methods, the method includes adjusting aiming in response to at least one data input, and wherein the at least one data input comprises at least data from at least one of the cameras, LIDAR sensing system, or RADAR sensing system.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

Figure 1A:
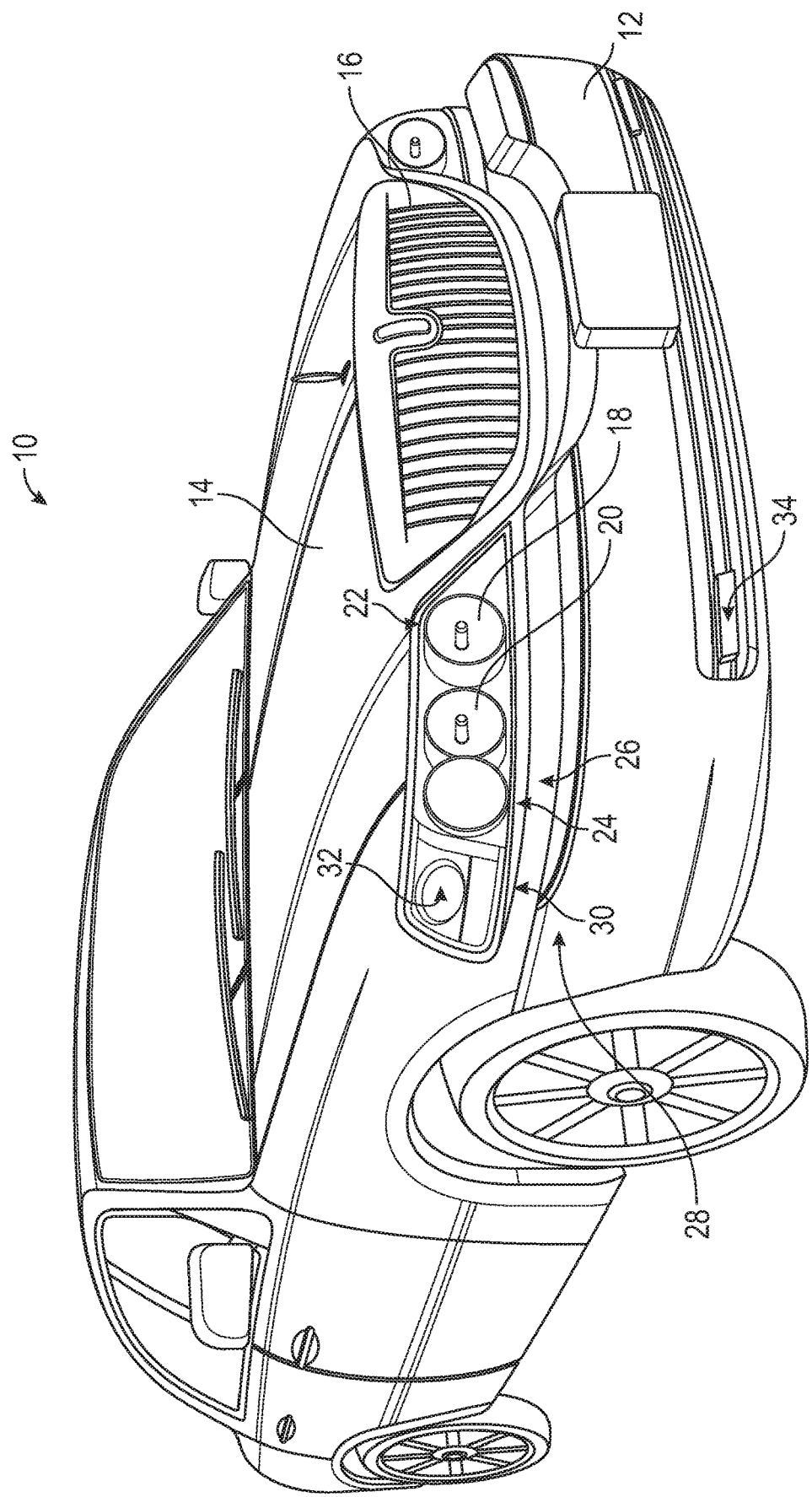
FIG. 1A illustrates a vehicle having a current light configuration.

This disclosure describes a lighting system for a vehicle and methods for adjusting aiming of all optical functions of a light module in multiple directions. FIG. 1A shows an example of a vehicle 10 having a current light system. In this example, the vehicle 10 includes a front bumper 12 and a hood 14 with a grill 16 that extends downwardly toward the front bumper 12. The vehicle 10 includes a plurality of different optical functions. An upper beam lamp 18 is located in a headlamp area above the front bumper 12 and near the grill 16, and a lower beam lamp 20 is located immediately outward of upper beam lamp 18. The daytime running lamp 22, park lamp 24, and turn signal 26 optical functions are also located in this same area. Side marker 28 and side reflector 30 optical functions are located outward of the lower beam lamp 20 near a front side edge of the vehicle. The corning lamp 32 optical function is also provided at this area. Fog lamps 34 are provided at a lower edge of the front bumper 12.

Figure 1B:
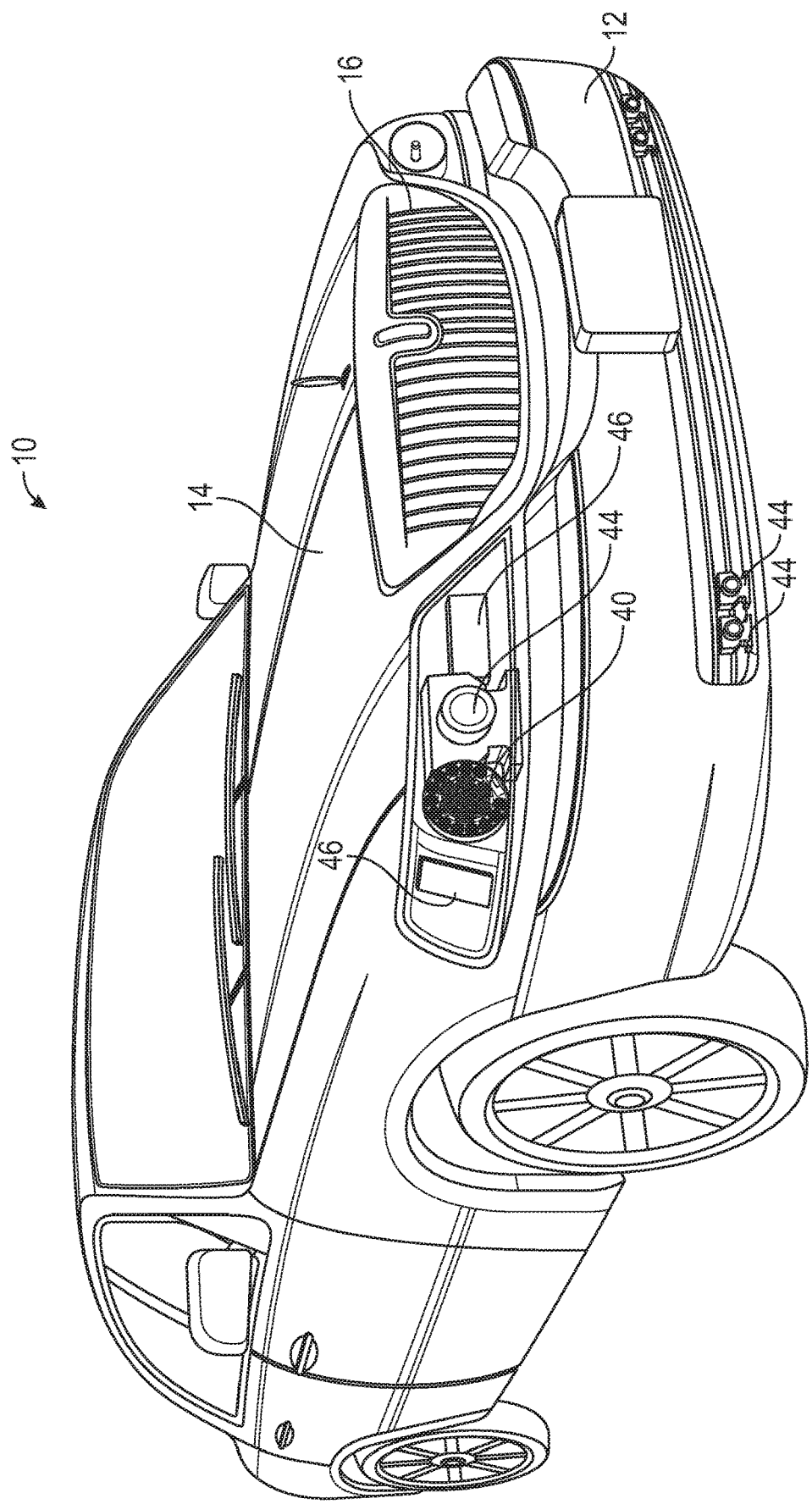
FIG. 1B illustrates a vehicle incorporating a Micro Front Lighting System (MFLS) according to the subject invention.

Having individual lamp modules at each of these locations is not cost effective and takes up a significant amount of packaging space. The subject invention provides a method and apparatus that includes a light module with a plurality of optical functions that are supported by a single housing, where all optical functions of the light module can have their aim adjusted in multiple directions. FIG. 1B shows one example of a light module 40 that is small, compact and incorporates a plurality of optical functions into a single unit. This light module 40 is installed in a traditional lower beam lamp location 42, which frees up space at the upper beam, cornering, side marker, side reflector, and fog lamp locations.

The light module 40 thus provides a Micro Front Lighting System (MFLS) that can perform all necessary optical functions from a single location. In one example, the light module 40 incorporates at least ten different optical functions as well as two mechanical functions (horizontal bend lighting and vertical aiming), which will be discussed in greater detail below. By freeing up space traditionally occupied by multiple headlamps and fog lamps, cameras 44 and Lidar/Radar/sensor components 46 can be positioned at these locations. Mounting these sensor components 46 and cameras 44 near the front and/or corner of the vehicle provides almost a 360 degree view of the surrounding environment, which is significant for autonomous vehicles. Traditionally, these components 46 and cameras 44 have been mounted to a roof of the vehicle which does not provide an aesthetically pleasing appearance. By integrating the cameras 44 and sensing components 46 into the front of the vehicle, the vehicle has the appearance and function of any other non-autonomous vehicle. Also, this is an optimum location for the cameras 44 and sensing components 46 as the front and front corner locations provide a wide range of visibility and detection in combination with limited or no obstructions, which improves autonomous driving capabilities.

FIGS. 2A-2D show the light module 40 in greater detail. In one example, the light module 40 includes a housing 50 having a front side 52 and an opposite rear side 54. The housing 50 defines a center axis A and has an outer peripheral surface 56 that surrounds the center axis A and supports a reflector material 58. The reflector material 58 extends only around a portion of the center axis A, and in one example the reflector material 58 extends less than 180 degrees about the center axis A.

A light or optic support member 60 is mounted to the housing 50 at the front side 52. The support member 60 supports a plurality of lights that include at least a first set of lights 62 circumferentially spaced about the center axis A, a second set of lights 64 circumferentially spaced about the center axis A, and a third set of lights 66 circumferentially spaced about the center axis A radially outward of the first 62 and second 64 sets of lights. The plurality of lights further includes at least one first light 68 concentric with the center axis A and radially inward of the first 62 and second 64 sets of lights, and at least one second light 70 positioned between two adjacent lights of the third set of lights 66.

Figure 2A:
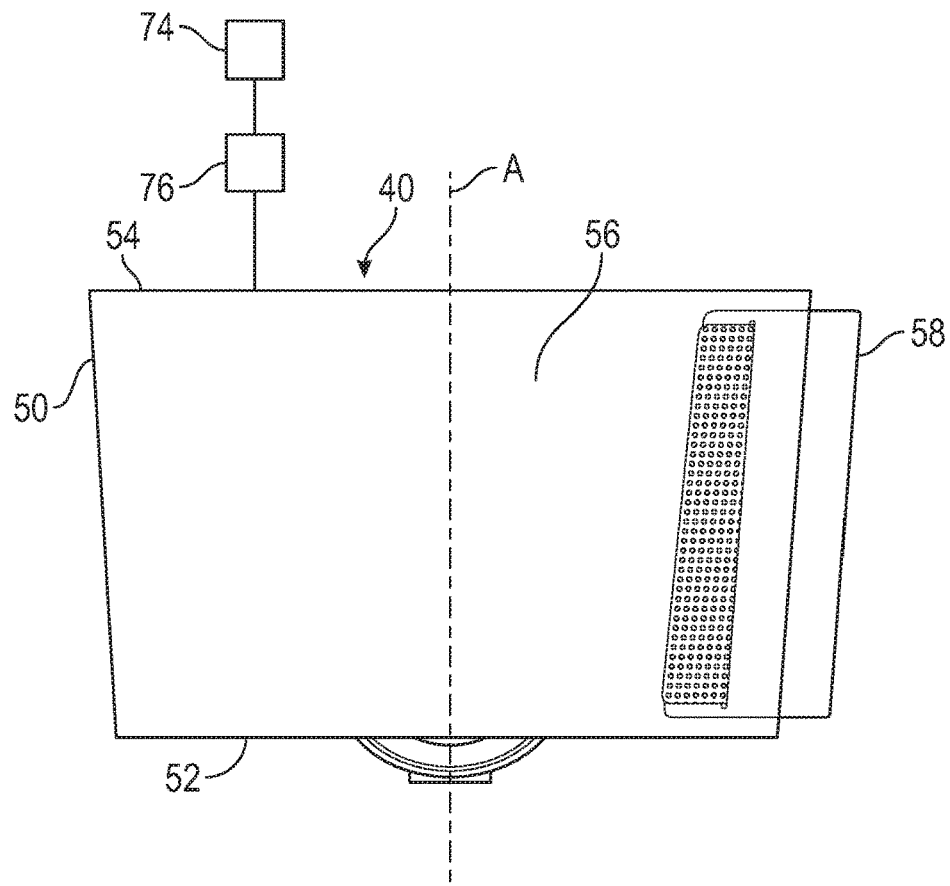
FIG. 2A is a top view of a light module from the MFLS of FIG. 1B.
Figure 2B:
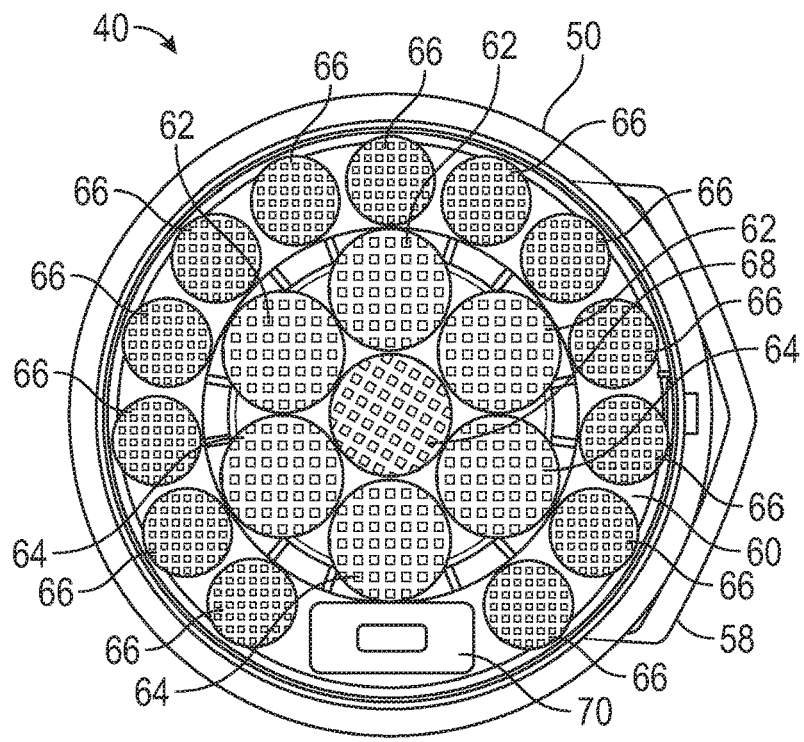
FIG. 2B is a front view of the light module of FIG. 2A.
Figure 2C:
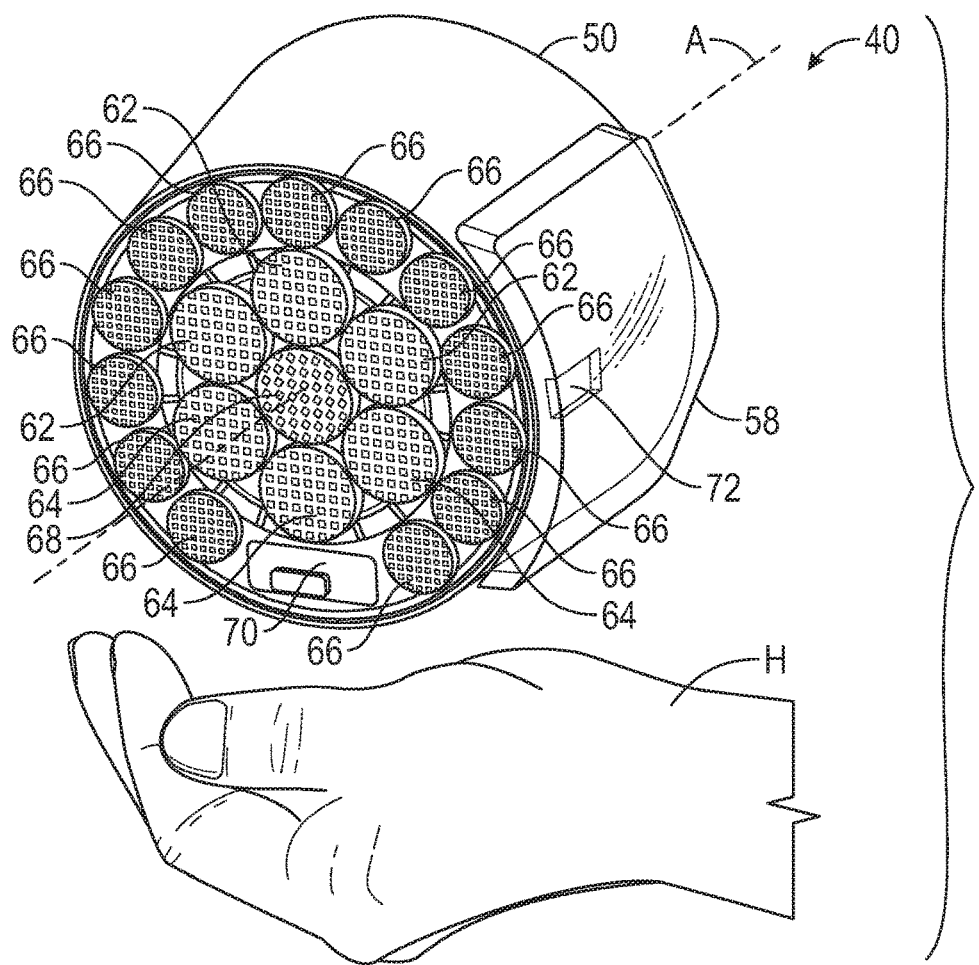
FIG. 2C is in isometric view of the light module of FIG. 2A.

As discussed above, the light module 40 incorporates a plurality of optical functions into a single unit that is small enough to be held by a hand H (FIG. 2C). In one example, the overall module diameter is approximately 95-100 mm or four inches. In one example configuration, this compact light module 40 incorporates at least 10 different optical functions; however, it should be understood that fewer functions or additional functions, in any combination, could be incorporated into the module 40. In the example shown in FIGS. 2A-2D, the plurality of optical functions include lower beam, upper beam, park, turn, daytime running lamp, cornering lamp, front side marker, front side reflector, fog lamp, and signature lighting.

As shown in FIG. 2B, the lower beam lights comprise the first set of lights 62 and the upper beam lights comprise the second set of lights 64. Both the first 62 and second 64 sets of lights are located at the same radial distance from the center axis A and with the first set of lights 64 surrounding one portion of the axis A and the second set of lights 64 surrounding the remaining portion. To achieve the upper beam optical function, both the first 62 and second 64 lights are on at the same time. The first 62 and/or second 64 sets of lights are also used to provide the daytime running lamp (DRL) optical function. These lights would be at a different intensity during the daytime than that which would be required during nighttime operation. The park and turn signal optical functions are provided by various combinations of the third set of lights 66. The park lamps are usually on at the same time the lower beam function is on, and the park and turn lamp optical functions can be achieved by varying intensity and/or blinking selected lights from the third set of lights 66.

The signature lighting function, which can display a logo or other decorative design for example, can use one or more of the lights from any of the sets. In one example, the signature lighting function is provided by the first light 68 at the center of the module 40. The fog lamp optical function can be provided, for example, by the second light 70 which is located near a lower edge of the module between adjacent lights of the third set of lights 66. The cornering lamp optical function is also provided by the second light 70. The intensity of the second light 70 can be varied as needed to provide the different optical functions. The second light 70 can be a single light or multiple lights, and can include an elongated and/or different shape than the adjacent lights 66.

Figure 2D:
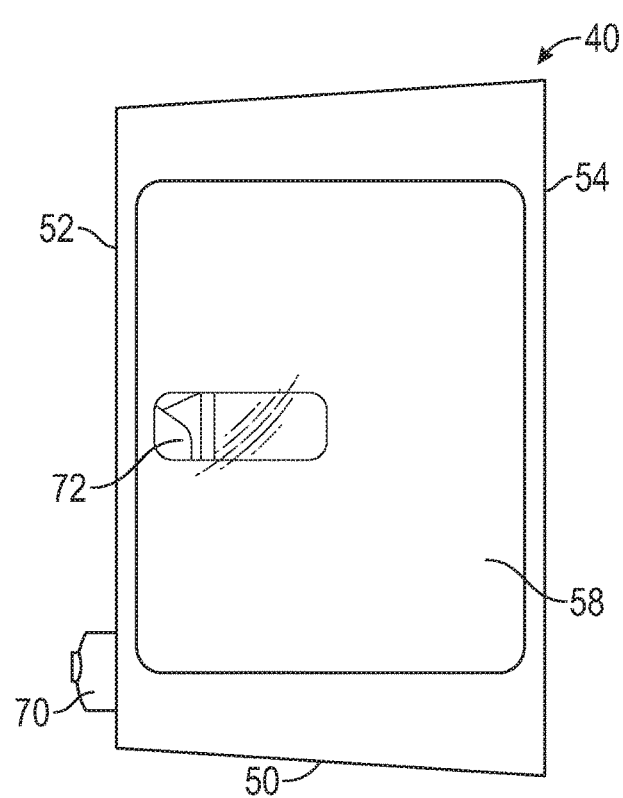
FIG. 2D is a side view of the light module of FIG. 2A.

The front side marker and front side reflector optical functions are best shown in FIGS. 2C and 2D. In one example, a window 72 is cut into the outer peripheral surface 56 of the housing 50. In one example, the reflector material 58 covers the window 72. One of the lights from the plurality of lights in the light module 40 shines through the window 72 to provide the side marker optical function. The reflective material 58 provides the side reflex optical function. Optionally, a window may not be required and a high intensity LED light could be utilized in the module to shine through the housing and reflector material to provide the side marker optical function.

The light module 40 also incorporates two mechanical functions. For example, the light module 40 incorporates horizontal bend lighting and vertical aiming for all ten optical functions. A control or control module is used to adjust aiming of all optical functions of the single light module 40 when needed, and the control is capable of adjusting the aim in multiple directions. The control includes an electronic control unit 74 that receives sensor data and generates control signals that are communicated to at least one motor 76 that is coupled to the housing 50 (FIG. 2A). Thus, all optical functions are now dynamic in both the horizontal and vertical directions and all of the optical functions can be simultaneously adjusted in multiple directions as one single unit when needed.

Figure 3:
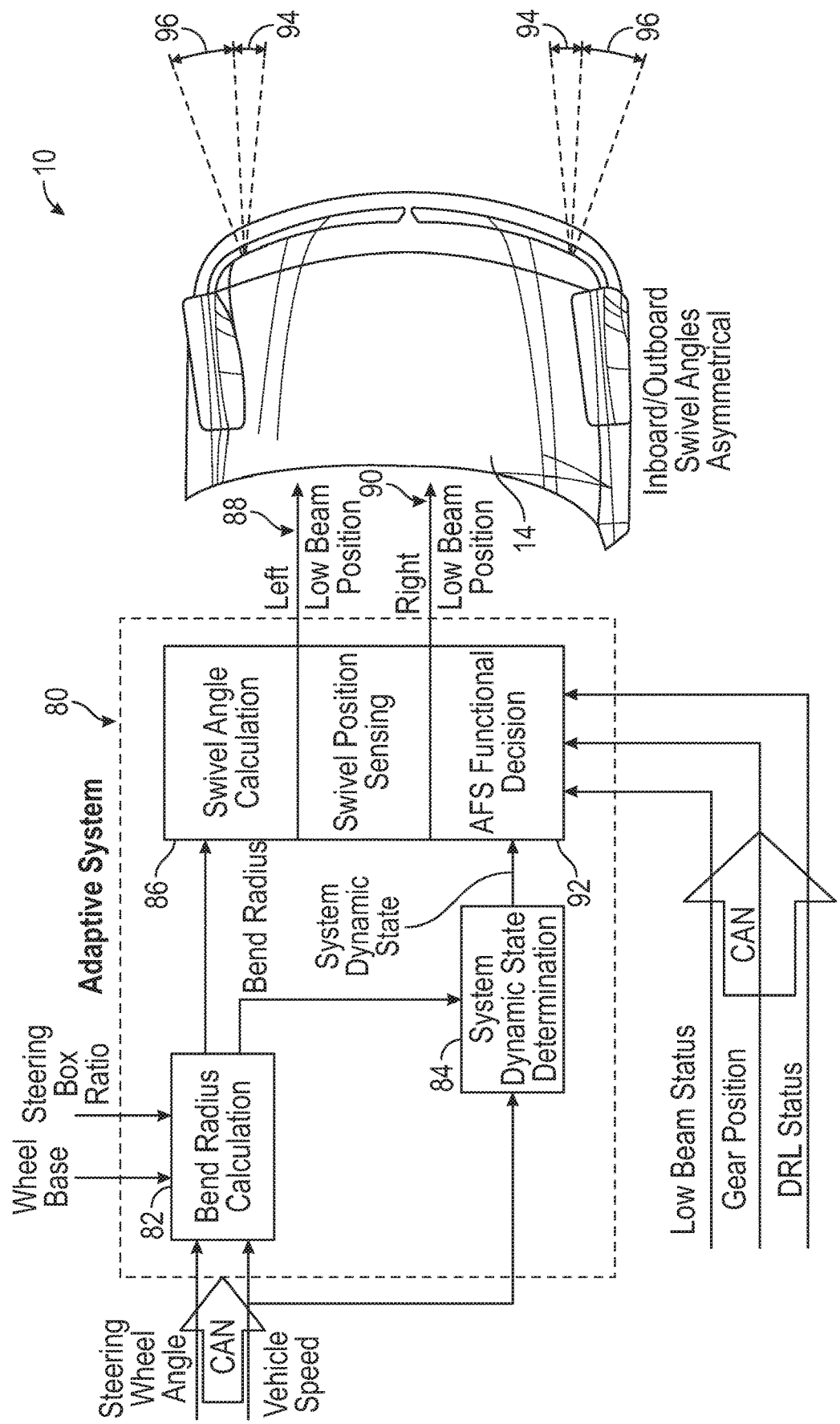
FIG. 3 schematically illustrates an exemplary method for horizontal aiming/bending of all optical functions for the light module of FIG. 2A.

One example of a control module 80 for the adaptive front lighting system (AFS), e. g. bend lighting, is shown in FIG. 3. In one example, aim is adjusted in response to at least one data input that includes one or more of vehicle speed, steering wheel angle, wheelbase, steering box ratio, and vehicle pitch. In the control module example of FIG. 3, input data such as wheelbase, steering box ratio, steering wheel angle, and vehicle speed data are communicated to the control module 80 for a bend radius calculation as indicated at 82. The bend radius calculation and vehicle speed are then used to determine a system dynamic state as indicated at 84. The bend radius is used to perform a swivel angle calculation as indicated at 86. The module 80 has swivel position sensing for a left light module 88 and a right light module 90. The system dynamic state, lower beam status, gear position, and DRL status are communicated to the control module 80 to provide an AFS Functional Decision as indicated at 92. This decision is communicated to the control module which can then use the motor 76 to provide horizontal aiming/bending for all ten optical functions together as a single unit. The inboard 94 and outboard 96 swivel angle ranges are asymmetrical. In one example, the inboard swivel angle range is five degrees and the outboard swivel angle range is fifteen degrees.

Figure 4A:
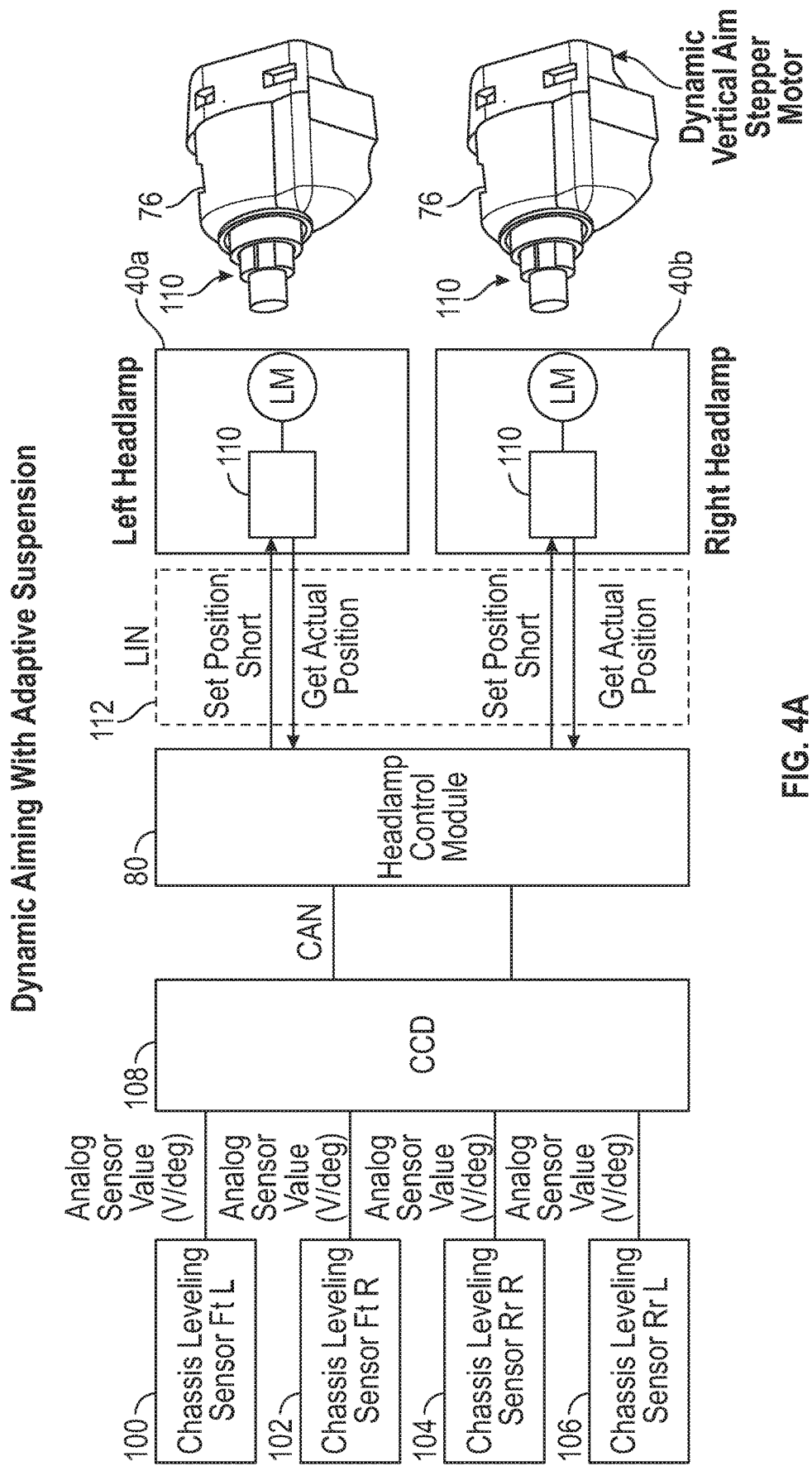
FIG. 4A shows one example of an adaptive suspension and automatic vertical aiming/levelling of all optical functions for the light module of FIG. 2A.
Figure 4B:
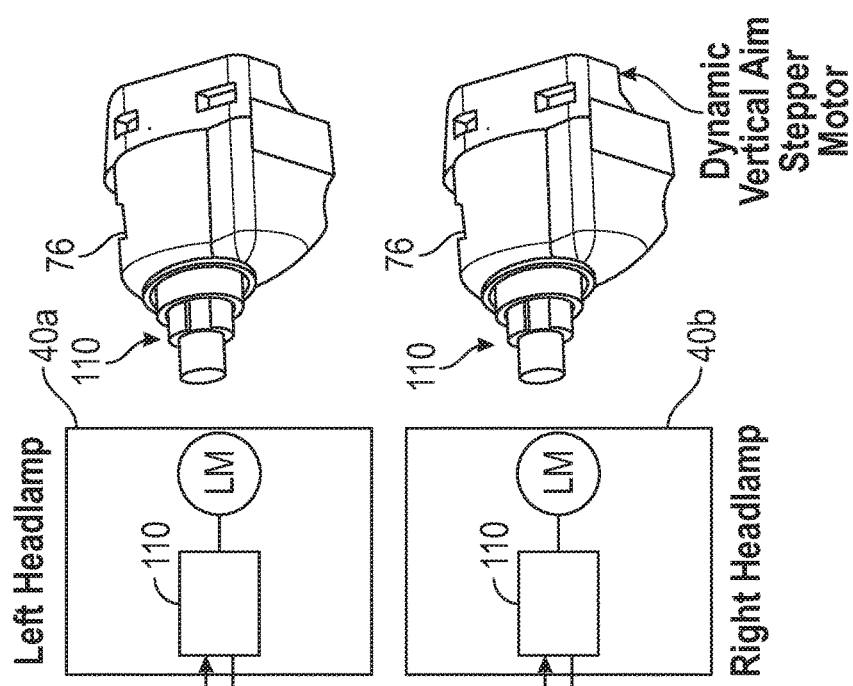
FIG. 4B shows an example without the adaptive suspension.
Figure 4B:
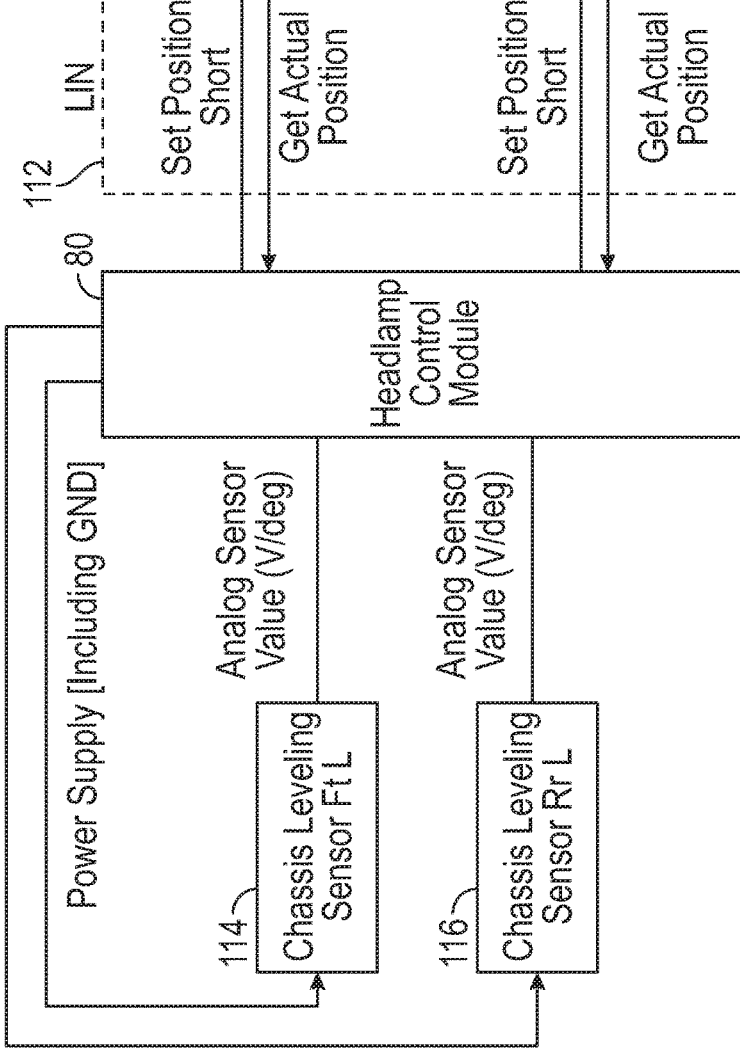

FIG. 4A shows one example of automatic vertical aiming/levelling with an adaptive suspension. FIG. 4B shows an example without the adaptive suspension. In FIG. 4A, a front left sensor 100, a front right sensor 102, a rear right sensor 104, and a rear left sensor 106 all communicate chassis levelling data to a continuously controlled damping system 108, which is in communication with the control module 80 of the light module 40. A local interconnect network (LIN) 112 is used to communicate data and control signals between the control module 80 and a left light module 40a and a right light module 40b. Sensors are used to determine the actual positions of the modules and then the control module 80 generates a control signal to activate the motors 76 within the housing 50 of the light modules 40a, 40b to adjust the vertical aiming of all ten optical functions at the same time. The motors 76 include an output shaft 110 that can provide a pivoting function as well as a linear adjustment function so that adjustment can occur in multiple directions. The control module 80 automatically adjusts the vertical aim/levelling position of the modules 40a, 40b in response to chassis leveling data from the sensors 100-106 to adjust for changes in vehicle pitch, for example.

FIG. 4B shows an example without an adaptive suspension. In this example, a front left sensor 114 and a rear left sensor 116 communicate chassis leveling data to the control module 80. The LIN 112 communicates data and control signals between the control module 80 and the left light module 40a. Sensors are used to determine the actual positions of the modules and then the control module 80 generates a control signal to activate the motor 76 within the housing 50 of the left light module 40a to adjust the vertical aiming of all ten optical functions at the same time. The motor 76 includes an output shaft 110 that can provide a pivoting function as well as a linear adjustment function to automatically adjust the vertical position as discussed above. The right light module 40b would be adjusted in a manner similar to that of the left light module 40b. While FIGS. 4A-4B show an example of automatic vertical aiming/levelling, the modules could also be manually adjusted.

Figure 5A:
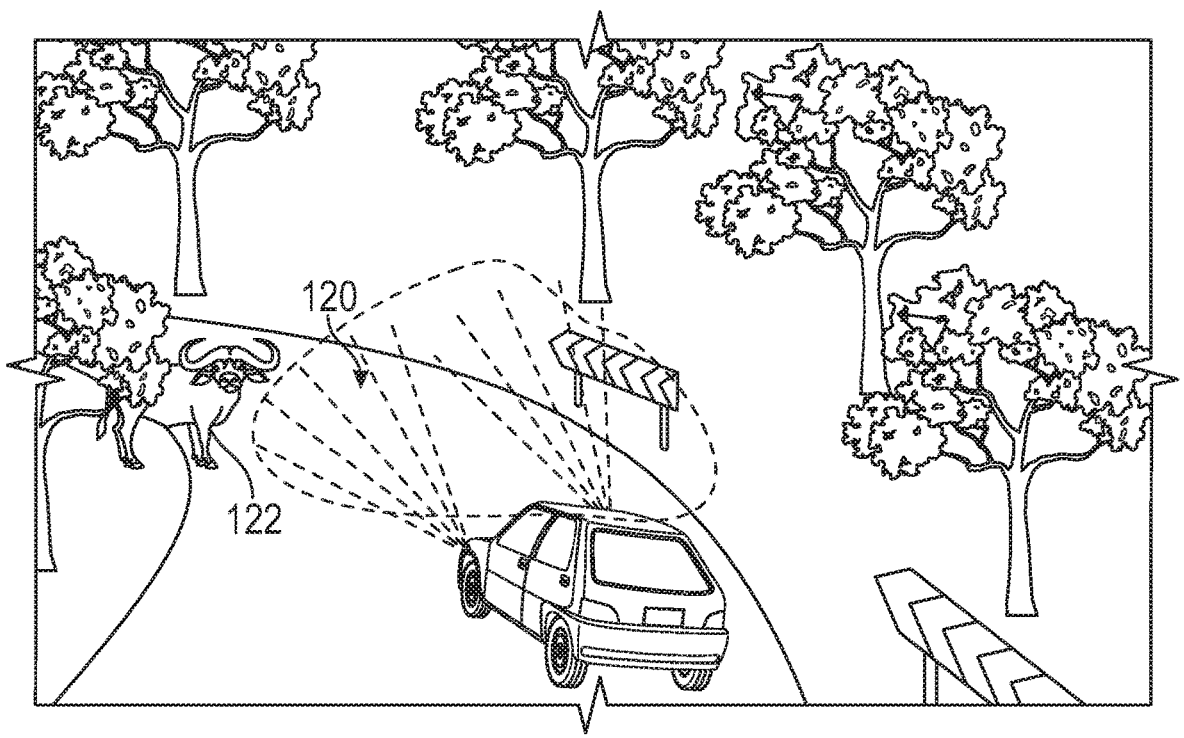
FIG. 5A shows an example where adaptive lighting is not used.
Figure 5B:
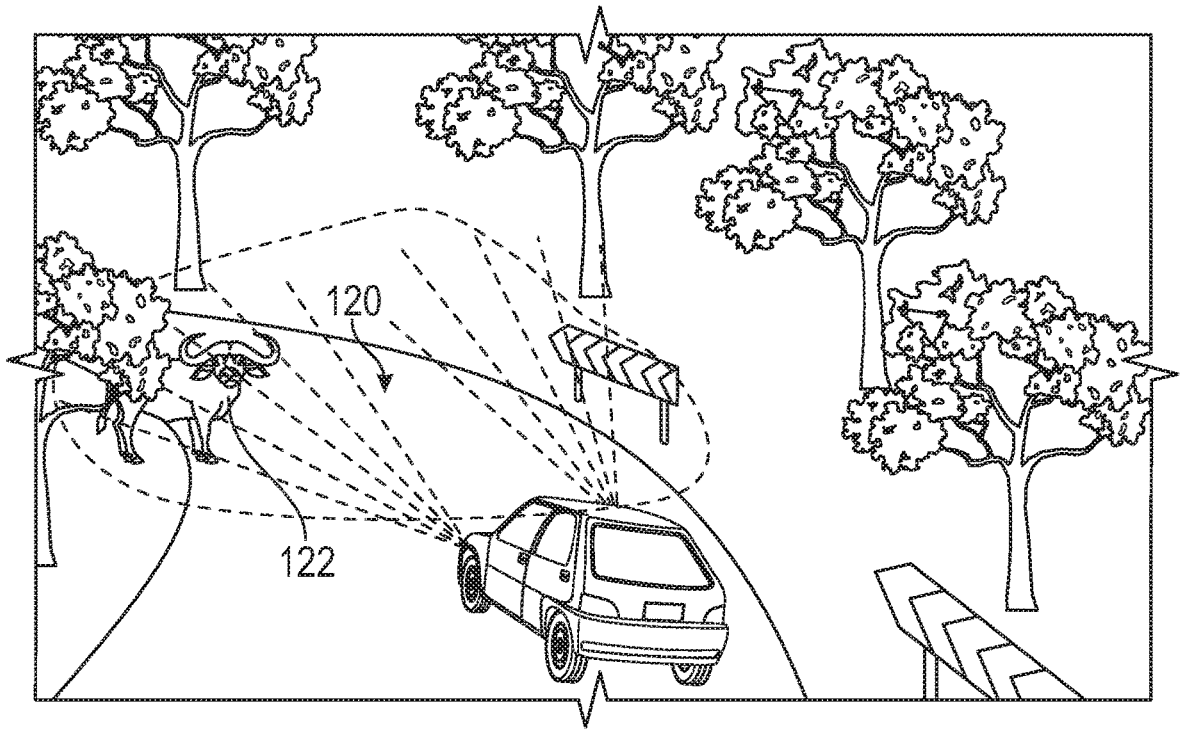
FIG. 5B shows an example of where adaptive lighting is used.

An example of the effect of the adaptive lighting is shown in FIGS. 5A and 5B. FIG. 5A shows an example where the lighted area 120 is directed off to an outer edge of the road at a curve. The lighted area 120 does not illuminate an object 122 at the inner edge of the road at the curve. FIG. 5B shows that with the MFLS, all functions move in the direction of the vehicle, which bends/aims the light around the curve such that the object 122 can be seen in the lighted area 120.

Figure 6A:
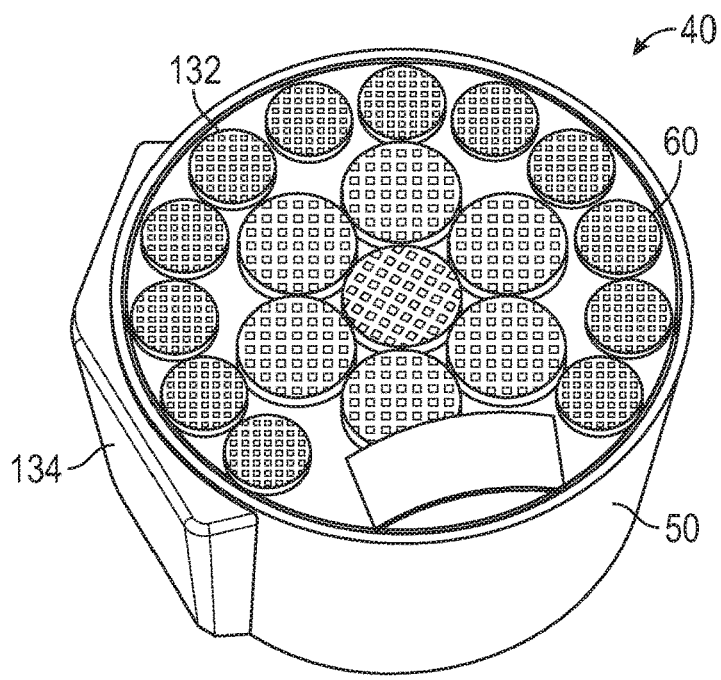
FIG. 6A shows a perspective view of one example of an assembled light module.

FIGS. 6A-6G show one example configuration of the basic components that make up the light module 40. FIG. 6A shows an assembled light module 40 with a front face 132 of the optic support member 60 facing outward of the housing 50. The outer peripheral surface 56 of the housing 50 includes a mount area 134 for the reflector material 58. In one example, the mount area 134 comprise a protruding boss that extends radially outwardly of the housing.

Figure 6B:
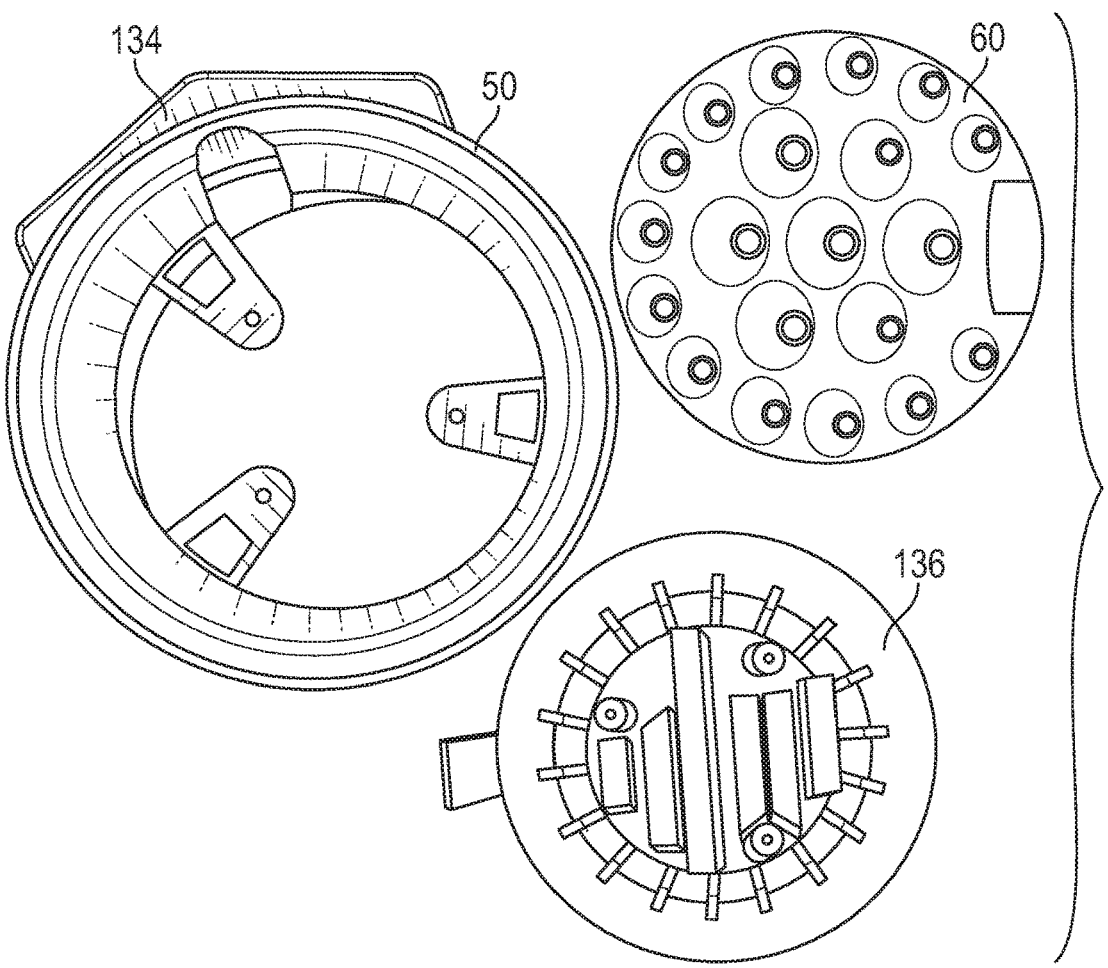
FIG. 6B shows the light module in an unassembled condition.
Figure 6C:
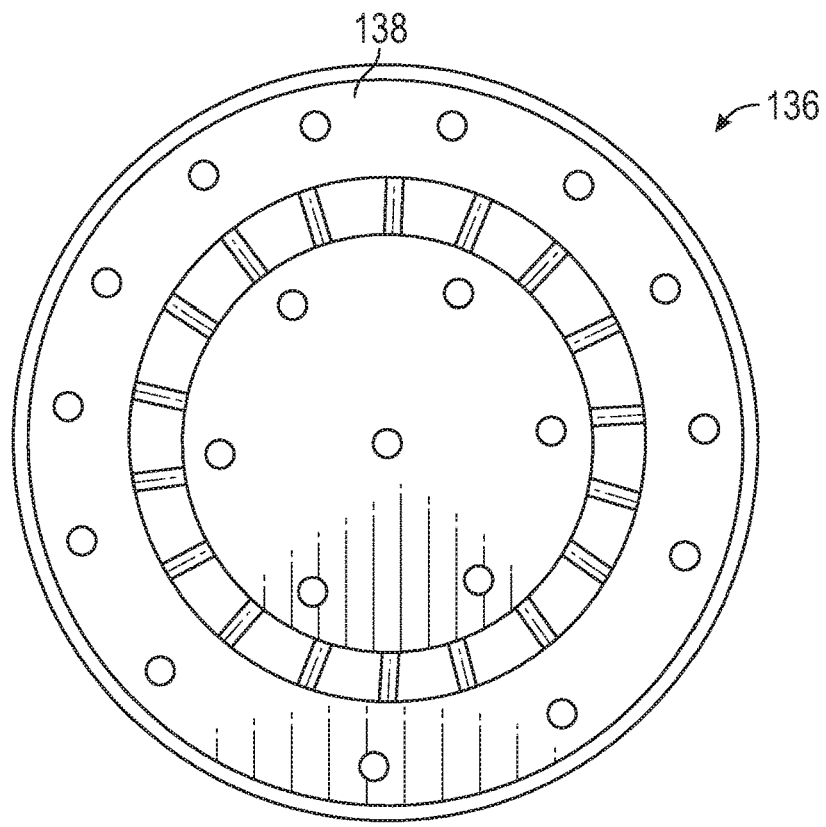
FIG. 6C is a front view of a circuit board carrier from the light module of FIG. 6A.

FIG. 6B shows the housing 50, optic support member 60, and a circuit board carrier 136 in an unassembled condition. A front face 138 of the circuit board carrier 136 is shown in FIG. 6C. The circuit board carrier 136 is mounted within the housing 150 and includes mounts for one or more circuit boards (not shown) such that the boards can be connected to the control module 80. FIG. 6F shows a rear face 140 of the circuit board carrier 136. The rear face 140 includes a plurality of protruding ribs 142 that provide a heat sink.

Figure 6D:
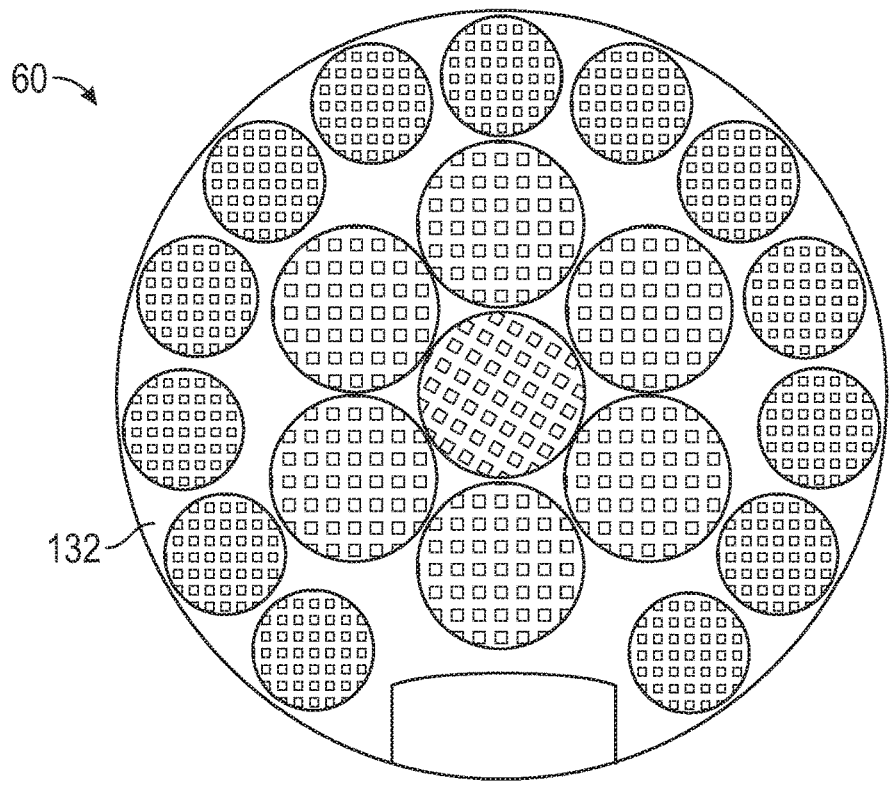
FIG. 6D is a front view of an optic support member from the light module of FIG. 6A.
Figure 6E:
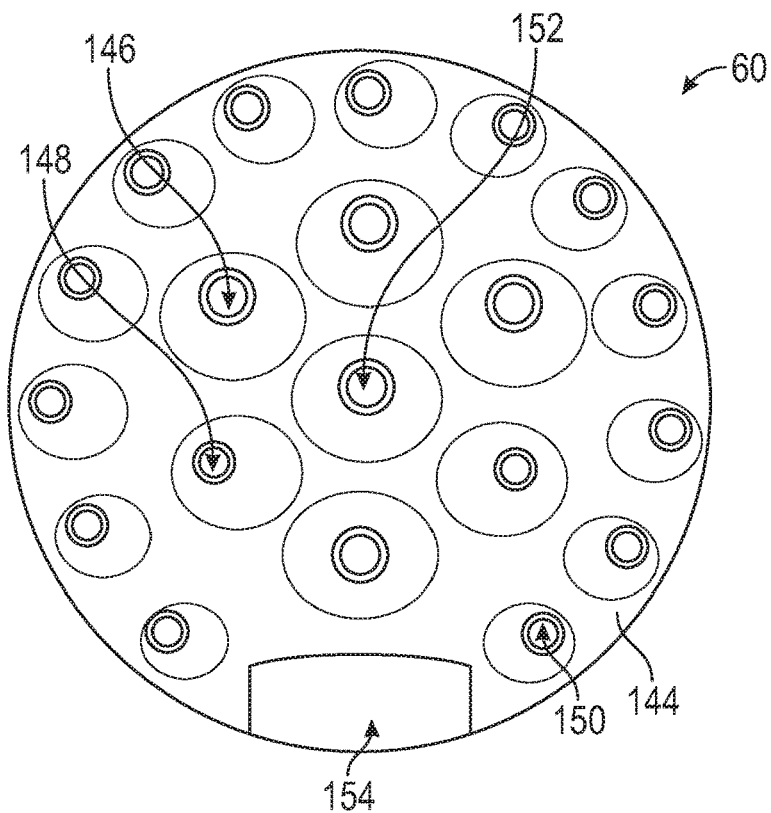
FIG. 6E is a rear view of the optic support member of FIG. 6D.
Figure 6F:
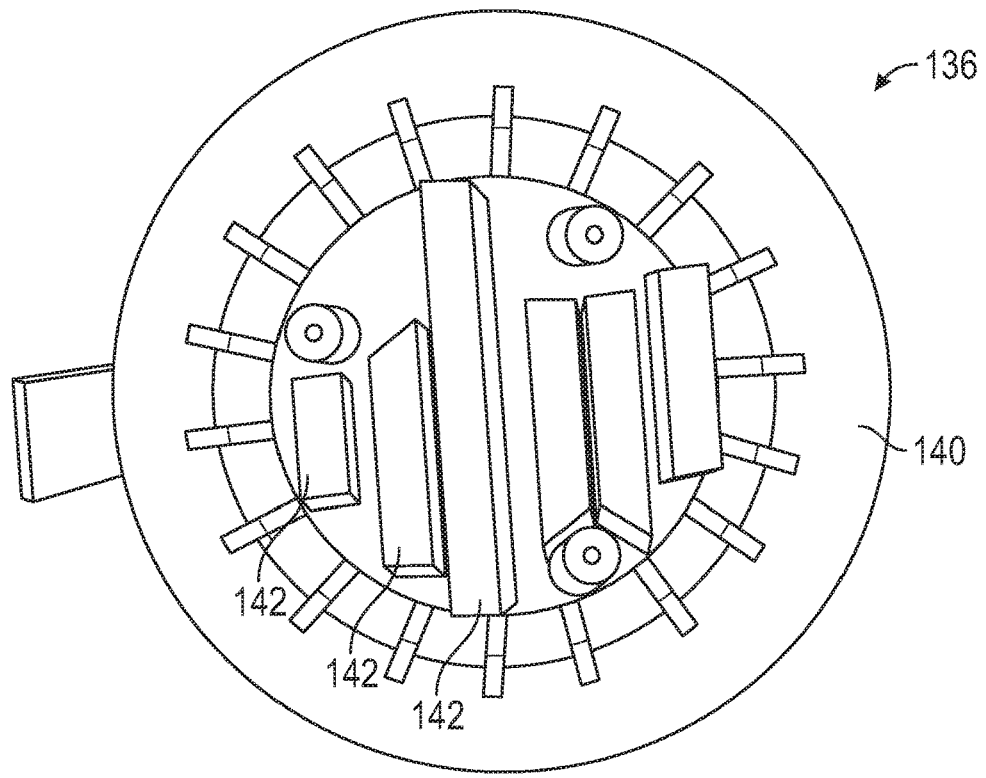
FIG. 6F is a rear view of the circuit board carrier of FIG. 6C.

FIG. 6D shows the front face 132 of the optic support member 60. FIG. 6E shows a rear face 144 of the optic support member 60. The optic support member 60 includes mounts 146 for the first set of lights 62, mounts 148 for the second set of lights 64, and mounts 150 for the third set of lights. There is also a mount 152 for the first light 68 and a mount 154 for the second light 70. Any type of light sources can be used in the light module, such as LEDs for example.

Figure 6G:
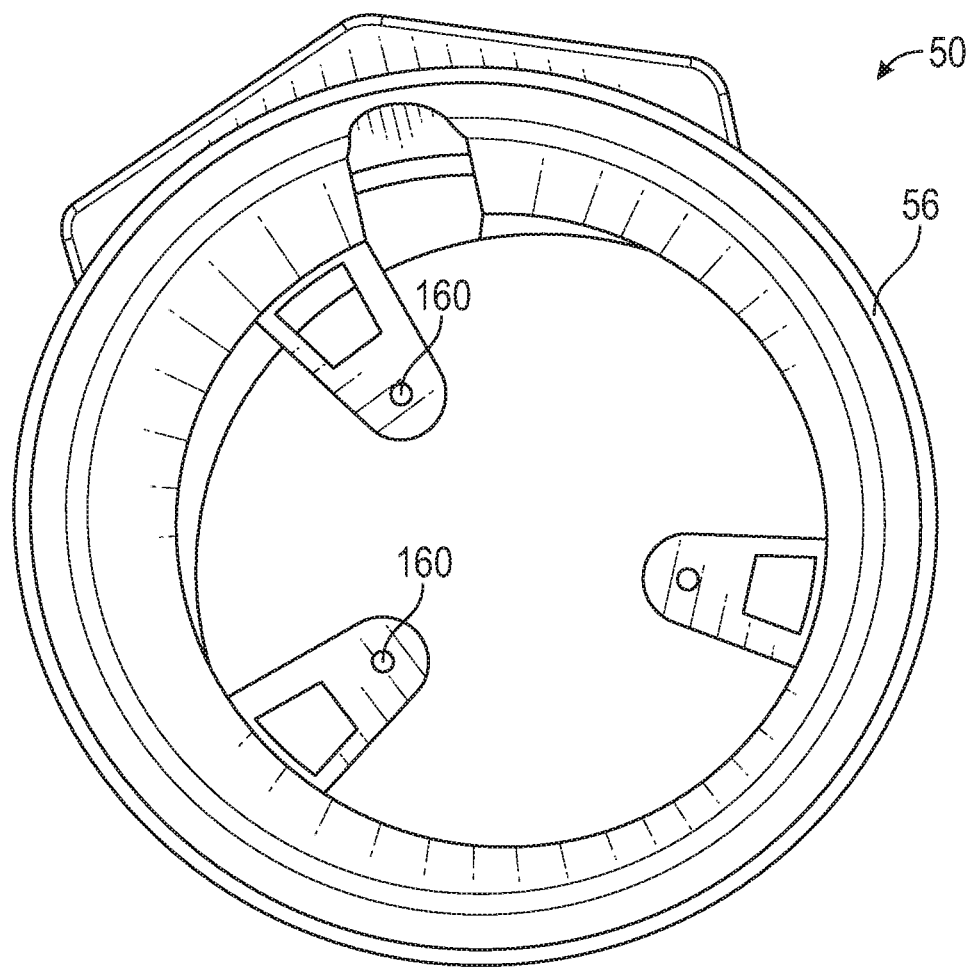
FIG. 6G is a front view of a housing from the light module of FIG. 6A.

FIG. 6G shows the housing 50 with the mount area 134 for the reflector material 58. The housing 50 defines an inner cavity that receives the circuit board carrier 136. The housing 50 includes mounting tabs 160 that extend radially inward to facilitate mounting of the carrier 136.

The subject invention provides a MFLS with a single light module that is reduced to a small packaging size such that multiple lighting functions can bend and move in the direction of the vehicle. This small module also allows cameras and sensors on vehicles equipped with automated driving systems (ADS) to be packaged in the space traditionally occupied by headlamps and fog lamps. This is an optimum location for the cameras and sensors as this location provides a wide range of visibility with almost no obstructions. This also provides for an improved, more traditional, appearance of ADS vehicles.

The subject invention also combines ten different front lighting functions and two different mechanical front lighting functions in a single module that is approximately 95-100 mm in diameter. All optical functions can be adjusted/aimed horizontally for bend lighting. All optical functions can also be adjusted/aimed vertically for optimum performance as vehicle pitch changes.

The subject light module is a lower cost and weight compared to traditional configurations using lights at multiple locations. Further, the module meets regulations globally for optics, areas, function, heights, etc. The module is modular such that it can be easily removed for "plug-n-play" executions. All ten front lighting functions swivel horizontally in the direction of the vehicle for optimum photometric performance All ten front lighting functions are aim-able vertically for optimum on-vehicle photometric performance.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
providing a light module that includes a plurality of optical functions supported by a single housing;
adjusting aiming of all optical functions of the light module in multiple directions, wherein the multiple directions include at least horizontal and vertical directions; and
coupling at least one motor to the housing to move the housing and all associated optical functions as a single unit, and wherein the plurality of optical functions include at least lower beam, upper beam, park, turn, daytime running, and cornering functions.

2. A method, comprising:
providing a light module that includes a plurality of optical functions supported by a single housing, wherein the plurality of optical functions include at least lower beam, upper beam, park, turn, daytime running, and cornering functions, and wherein the plurality of optical functions further include one or more of front side marker, front side reflector, fog, and signature light functions, wherein the signature light function displays a logo or decorative design; and
adjusting aiming of all optical functions of the light module in multiple directions, wherein the multiple directions include at least horizontal and vertical directions.

3. The method as recited in claim 1, including adjusting aiming of all optical functions simultaneously as one unit.

4. The method as recited in claim 1, including adjusting aiming in response to at least one data input that includes one or more of vehicle speed, steering wheel angle, wheelbase, steering box ratio, and vehicle pitch.

5. A method, comprising:
providing a light module that includes a plurality of optical functions supported by a single housing;
installing the light module at a headlamp location on a front end of an autonomous vehicle, and installing at least one camera immediately adjacent to the light module on the front end of the autonomous vehicle; and
adjusting aiming of all optical functions of the light module in multiple directions, wherein the multiple directions include at least horizontal and vertical directions.

6. A method, comprising:
providing a light module that includes a plurality of optical functions supported by a single housing;
installing the light module at a headlamp location on a front end of an autonomous vehicle;
installing at least one camera immediately adjacent to the light module on the front end of the autonomous vehicle;
installing at least one additional camera on the front end and installing at least one of a LIDAR or RADAR sensing system on the front end; and
adjusting aiming of all optical functions of the light module in multiple directions.

7. The method as recited in claim 6, including adjusting aiming in response to at least one data input, and wherein the at least one data input comprises at least data from at least one of the cameras, LIDAR sensing system, or RADAR sensing system.

8. An apparatus, comprising:
a housing that defines a center axis and has an outer peripheral surface that surrounds the center axis;
a plurality of lights to perform a plurality of optical functions, each light supported by the housing to provide a single light module, wherein at least a subset of the plurality of lights are circumferentially spaced apart from each other about the center axis, and wherein the housing encloses multiple lights of the plurality of lights;
at least one motor coupled to the housing to move the housing and all associated optical functions as a single unit; and
a control to adjust aiming of all optical functions of the single light module when needed, wherein the control is capable of adjusting aim in multiple directions, and wherein the multiple directions include at least horizontal and vertical directions.

9. The apparatus as recited in claim 8, wherein the plurality of optical functions includes at least eight different optical functions.

10. The apparatus as recited in claim 9, wherein the plurality of optical functions further include at least two additional different optical functions.

11. An apparatus, comprising:
a housing;
a plurality of lights to perform a plurality of optical functions, each light supported by the housing to provide a single light module, wherein the plurality of optical functions includes at least eight different optical functions, wherein the plurality of optical functions further include at least two additional different optical functions, and wherein the plurality of optical functions include lower beam, upper beam, park, turn, daytime running, cornering, front side marker, front side reflector, fog, and signature light functions, wherein the signature light function displays a logo or decorative design; and
a control to adjust aiming of all optical functions of the single light module when needed, wherein the control is capable of adjusting aim in multiple directions, and wherein the multiple directions include at least horizontal and vertical directions.

12. The apparatus as recited in claim 8, wherein the control includes an electronic control unit that generates control signals that are communicated to at least one motor coupled to the housing.

13. The apparatus as recited in claim 12, wherein the light module includes a circuit board carrier fixed within the housing, an optics support supported by the housing, at least one printed circuit board coupled to the circuit board carrier and in communication with the electronic control unit, and wherein the plurality of lights is mounted to the optics support.

14. An apparatus, comprising:
a housing defining a center axis;
a plurality of lights to perform a plurality of optical functions, each light supported by the housing to provide a single light module;
a control to adjust aiming of all optical functions of the single light module when needed, wherein the control is capable of adjusting aim in multiple directions;
wherein the light module includes a circuit board carrier fixed within the housing, an optics support supported by the housing, at least one printed circuit board coupled to the circuit board carrier and in communication with the electronic control unit, and wherein the plurality of lights is mounted to the optics support, and wherein the plurality of lights include a first set of lights circumferentially spaced about the center axis, a second set of lights circumferentially spaced about the center axis, and a third set of lights circumferentially spaced about the center axis radially outward of the first and second sets of lights; and
wherein the control includes an electronic control unit that generates control signals that are communicated to at least one motor coupled to the housing.

15. The apparatus as recited in claim 14, wherein the plurality of lights further includes at least one first light concentric with the center axis and radially inward of the first and second sets of lights, and at least one second light positioned between two adjacent lights of the third set of lights.

16. The apparatus as recited in claim 14, including a device mounted to an outer peripheral surface of the housing, wherein the device assists in providing front side marker and front side reflex optical functions.

17. An apparatus, comprising:
a housing;
a plurality of lights to perform a plurality of optical functions, each light supported by the housing to provide a single light module, and wherein the single light module is configured to be installed at a headlamp location on a front end of an autonomous vehicle, and including a plurality of cameras with at least one camera being immediately adjacent to the single light module on the front end of the autonomous vehicle, and including at least one of a LIDAR or RADAR sensing system on the front end; and
a control to adjust aiming of all optical functions of the single light module when needed, wherein the control is capable of adjusting aim in multiple directions, and wherein the multiple directions include at least horizontal and vertical directions.

18. A method, comprising:
providing a light module that includes a plurality of optical functions supported by a single housing;
providing a plurality of lights to perform the plurality of optical functions, wherein the plurality of lights include a first set of lights circumferentially spaced about a center axis, a second set of lights circumferentially spaced about the center axis, and a third set of lights circumferentially spaced about the center axis radially outward of the first and second sets of lights; and
adjusting aiming of all optical functions of the light module in multiple directions, wherein the multiple directions include at least horizontal and vertical directions.

* * * * *